United States Patent [19]

Lowery

[11] Patent Number: 4,980,013

[45] Date of Patent: Dec. 25, 1990

[54] APPARATUS FOR FORMING AND CURING AN I-SECTION WORKPIECE

[75] Inventor: Patrick A. Lowery, Auburn, Wash.

[73] Assignee: The Boeing Company, Seattle, Wash.

[21] Appl. No.: 267,476

[22] Filed: Nov. 4, 1988

[51] Int. Cl.⁵ .............................................. B29C 53/36
[52] U.S. Cl. .................................. 156/443; 100/93 P;
100/232; 156/583.1; 425/398; 425/403.1
[58] Field of Search ............... 156/182, 196, 212, 214,
156/228, 245, 443, 493, 583.1, 583.3, 580;
100/232, 93 P; 264/248, 339, 258; 425/394,
398, 403.1, 406

[56] References Cited

U.S. PATENT DOCUMENTS

| | | | |
|---|---|---|---|
| 2,034,731 | 3/1936 | Saalbach | 18/56 |
| 2,676,704 | 4/1954 | Marks | 206/80 |
| 2,683,105 | 7/1954 | Forbes et al. | 156/312 |
| 3,020,596 | 2/1962 | Clapp et al. | 18/56 |
| 3,476,625 | 11/1969 | Slivinsky et al. | 156/214 |
| 3,487,139 | 12/1969 | Mojonnier | 264/132 |
| 3,557,277 | 1/1971 | Brodersen et al. | 264/339 |
| 3,679,498 | 7/1972 | Andersen | 156/245 |
| 3,995,080 | 11/1976 | Cogburn et al. | 428/35 |
| 3,995,081 | 11/1976 | Fant et al. | 428/119 |
| 4,020,202 | 4/1977 | Kreft | 428/33 |
| 4,124,242 | 11/1978 | Canner | 264/258 |
| 4,151,031 | 4/1979 | Goad et al. | 156/228 |
| 4,225,553 | 9/1980 | Hirota et al. | 264/292 |
| 4,379,798 | 4/1983 | Palmer et al. | 428/113 |
| 4,390,384 | 6/1983 | Turner | 156/221 |
| 4,407,772 | 10/1983 | Maglio | 156/245 |
| 4,475,976 | 10/1984 | Mittelstadt et al. | 156/221 |
| 4,559,194 | 12/1985 | Hegenstaller | 264/257 |
| 4,566,231 | 1/1986 | Konsevich | 52/145 |
| 4,657,717 | 4/1987 | Cattanach et al. | 264/10.2 |
| 4,744,741 | 5/1988 | Glover et al. | 264/248 |
| 4,756,863 | 7/1988 | Petershofer | 264/339 |
| 4,800,111 | 1/1989 | Pflug et al. | 156/212 |

FOREIGN PATENT DOCUMENTS

| | | | |
|---|---|---|---|
| 0A51206 | 12/1941 | France | 156/580 |
| 61-74701 | 4/1986 | Japan . | |
| 61-74702 | 4/1986 | Japan . | |
| 0794142 | 4/1958 | United Kingdom | 156/196 |
| 1455572 | 11/1976 | United Kingdom . | |

Primary Examiner—Michael W. Ball
Assistant Examiner—Steven D. Maki
Attorney, Agent, or Firm—Robert H. Sproule; B. A. Donahue

[57] ABSTRACT

A system for forming an I-section workpiece includes a transporter having a pair of mandrels onto which two unformed changes are placed. The transporter carries the mandrels to a forming station which includes a pair of forming enclosures which contain heating elements and compliant material therein. By insertion of the mandrels into the compliant material, the charges are caused to bend around the mandrels thereby generating a pair of formed elements having channel shaped cross-sections. The elements are then carried by the transporter to a cure station where they are joined together by heated mandrels so that a one piece I-section workpiece is formed.

15 Claims, 8 Drawing Sheets

APPARATUS FOR FORMING AND CURING AN I-SECTION WORKPIECE

TECHNICAL FIELD

The present invention relates to a system for forming and curing an I-section workpiece, and more particularly to a system for forming an I-section stringer made of composite material and for curing the stringer after it has been formed.

BACKGROUND OF THE INVENTION

In the manufacture of aircraft skin panels, it is common to attach I-section stringers to the back of the skin panels. These stringers not only provide reinforcement, they also provide a location for attaching the skin panels to the ribs or frame of the aircraft.

Typically, the skin panels and I-section stringers are made from a graphite epoxy composite material which must be cured. One conventional method has been to bond uncured I-section stringers to uncured skin panels in a single cocuring operation. In this manner the stringers are bonded to the skin panels during the curing process. Another method has been to cure the skin panels first, and then to bond the precured skin panels to uncured stringers during a second curing operation. Still another method has been to cure the stringers and skin panels separately and then bond them with adhesive in a subsequent elevated temperature operation.

Conventionally, the curing of composite materials has involved an autoclave process which is quite labor intensive and costly. Prior to placing the stringers in the autoclave, preparation of the stringers has involved numerous manually performed tasks such as, for example, carefully trimming stringer flanges flush with layup mandrel surfaces to avoid mandrel entrapment during cure, taping the ends and sides of the stringer/mandrel assemblies to contain epoxy resin flow, placing a parting film over the components, covering the components with a breather material, placing a nylon bag over the breather material and taping the bag in place. Once the stringers have been cured, this covering material must be removed.

In order to minimize the number of times the above autoclave process is performed, it has been preferable to use a single cocuring process. However, the difficulty of fitting bag materials snugly into the corner where the stringer/mandrel assemblies join the skin panel can result in bridging of the bag and a consequent deformation of the skin panels on the bagside surface during cure. The deformation problem can be avoided by precuring the skin panels, however this involves utilizing the autoclave a first time to precure the skin panels, and a second time to bond uncured stringers to the skin panels. In this case of precured stringers bonded to precured skins, one or more autoclave cycles are required to produce the precured details, followed by a secondary bonding operation in an autoclave or oven.

It was perceived that the fabrication and cost problems of conventional methods could be solved by a cost-effective, non-autoclave process for producing precured stringers.

SUMMARY OF THE INVENTION

The present invention pertains to a system for forming an I-section workpiece without using an autoclave. The system includes means for supporting uncured first and second elements for forming the workpiece. The supporting means includes a first mandrel for supporting the unformed first workpiece element and a second mandrel for supporting the unformed second workpiece element.

Also included in the present invention are means for forming the first and second workpiece elements into first and second portions (channels) of the I-section workpiece. Each formed portion of the workpiece includes a middle (web) and first and second sidewalls (flanges) extending from the middle.

In addition, there are first means for applying heat and pressure to the middle of the first portion and to the middle of the second portion to cure the middle of the first and second portions and to bond the middle of the first portion to the middle of the second portion. In addition, there are second means for applying heat and pressure to the sidewalls of the first portion and to the sidewalls of the second portion to cure the sidewalls of the first and second portions.

BRIEF DESCRIPTION OF THE DRAWINGS

The present invention will be described in greater detail by referring to the following detailed description in conjunction with the attached drawings, in which.

DETAILED DESCRIPTION

Figure 1:
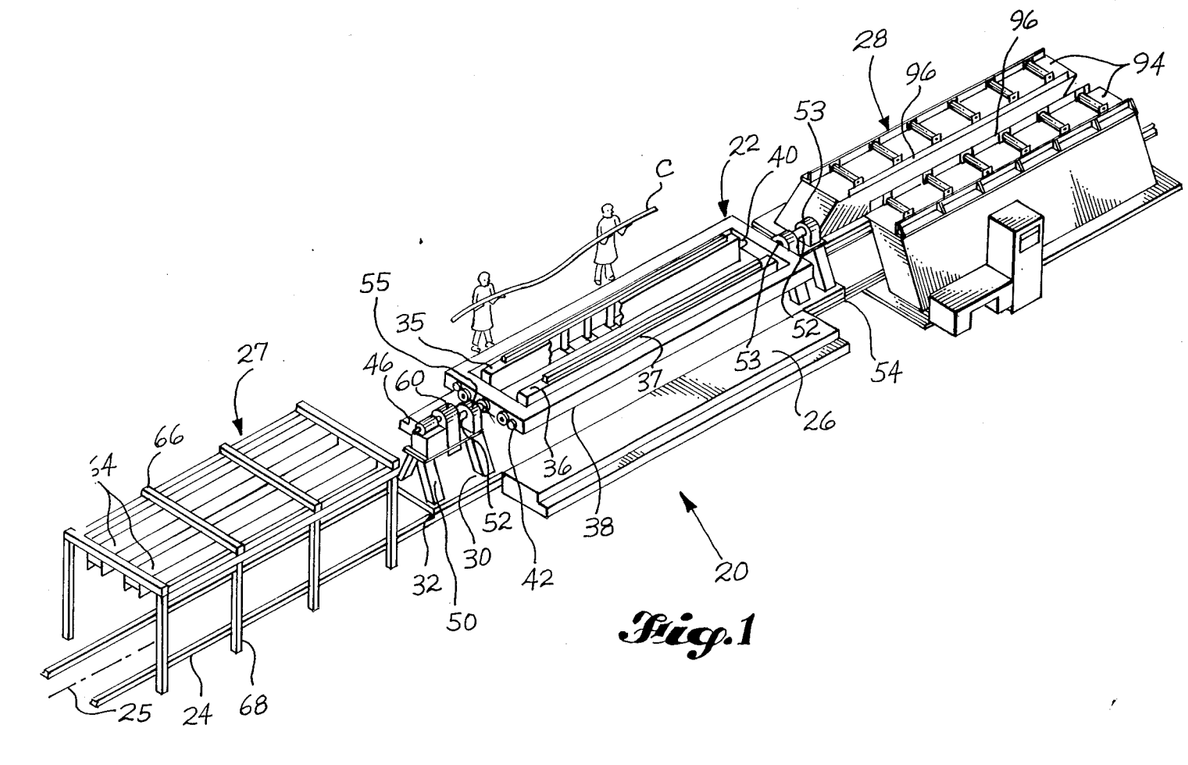
FIG. 1 is a pictorial view of a I-section fabrication system of the present invention showing unformed charges being loaded on a transporter assembly at a load/unload station.

The present invention pertains to a system for forming and curing an I-section workpiece, such as an I-section aircraft stringer. There is shown in FIG. 1 a fabrication system generally indicated at 20 for carrying out this invention. The fabrication system includes a transporter assembly indicated at 22 which is mounted on a track 24. The track 24 is located along a lengthwise axis identified by a number 25 for carrying the transporter from a central load/unload station (identified by stairs 26) where two unformed stringer charges C are loaded onto the transporter, leftward to a hot drape form station indicated at 27. In an exemplary embodiment, the stringer charges have a flat shape and are made of a graphite epoxy composite material.

Figure 2:
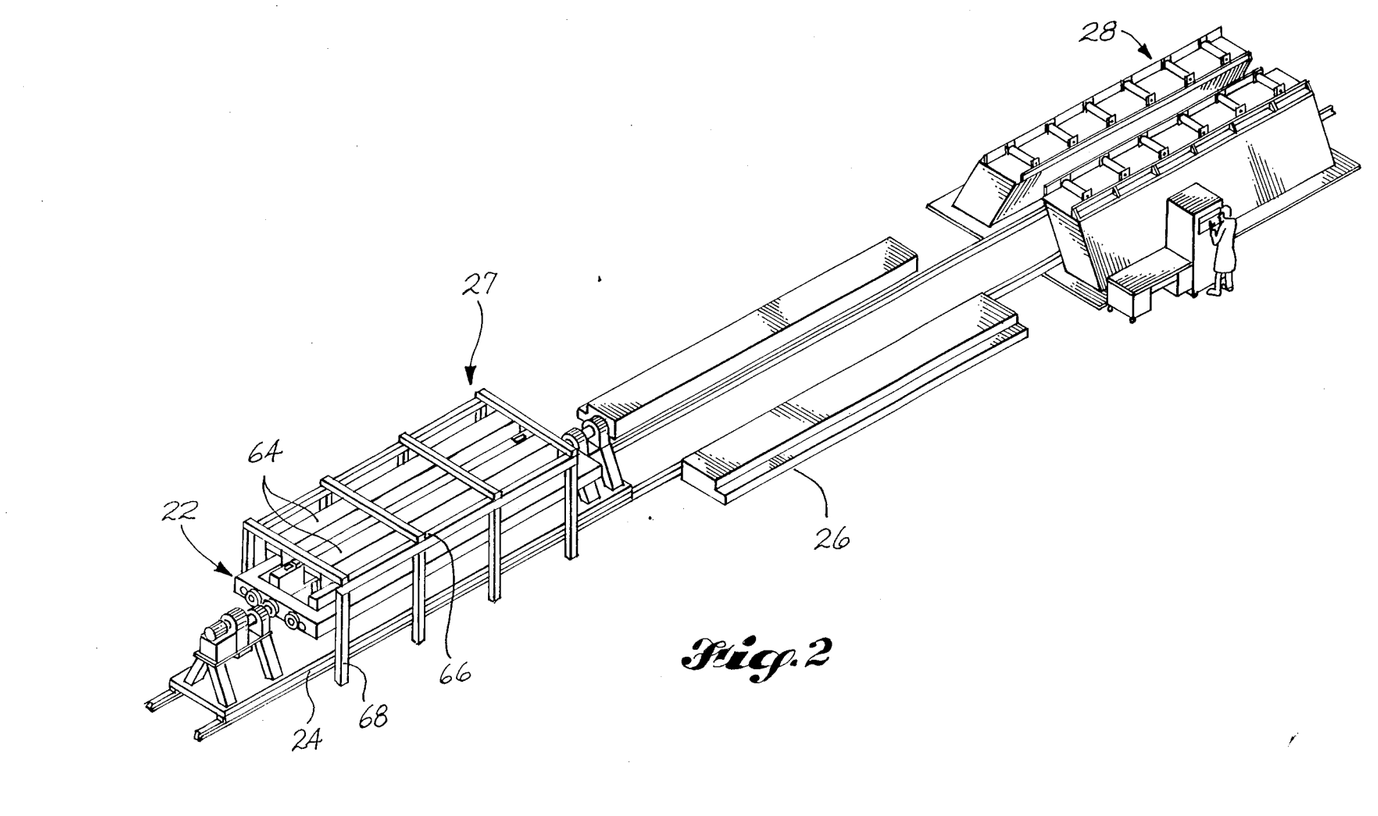
FIG. 2 is a view similar to FIG. 1 showing the transporter assembly at a station for forming the charges.
Figure 3:
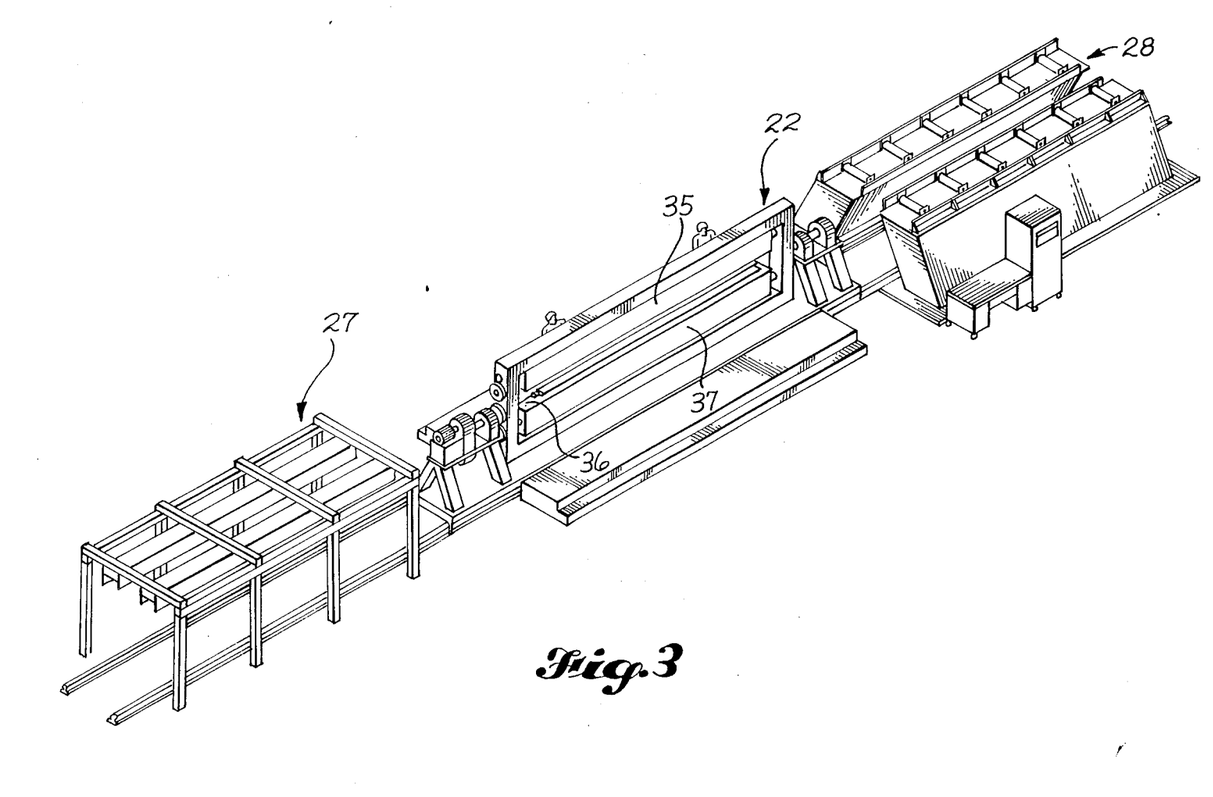
FIG. 3 is a view similar to FIG. 1 showing the transporter assembly again at the load/unload station for attaching radius fillers, cap and peel ply to the formed charges.
Figure 4:
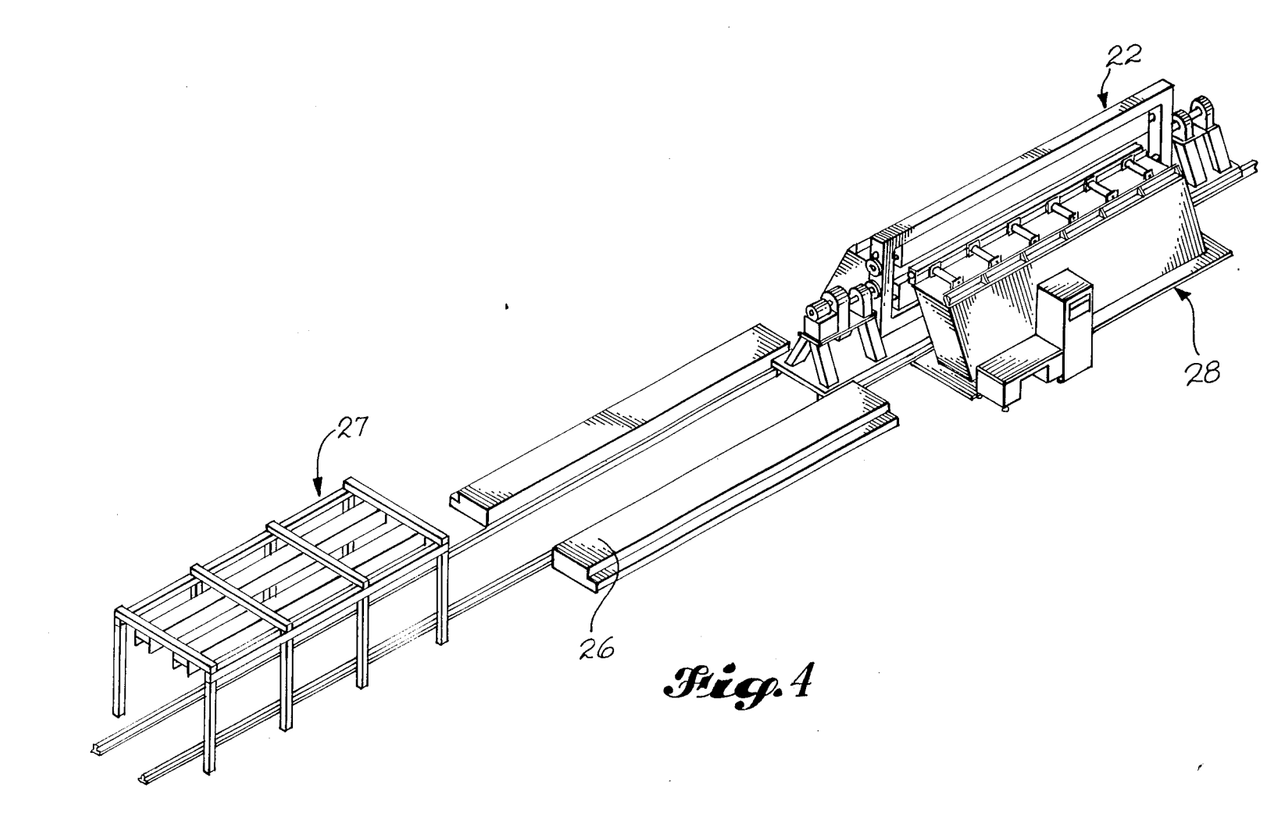
FIG. 4 is a view similar to FIG. 1 showing the transporter assembly at a station for curing the formed charges and joining them together to form an I-section workpiece.
Figure 5:
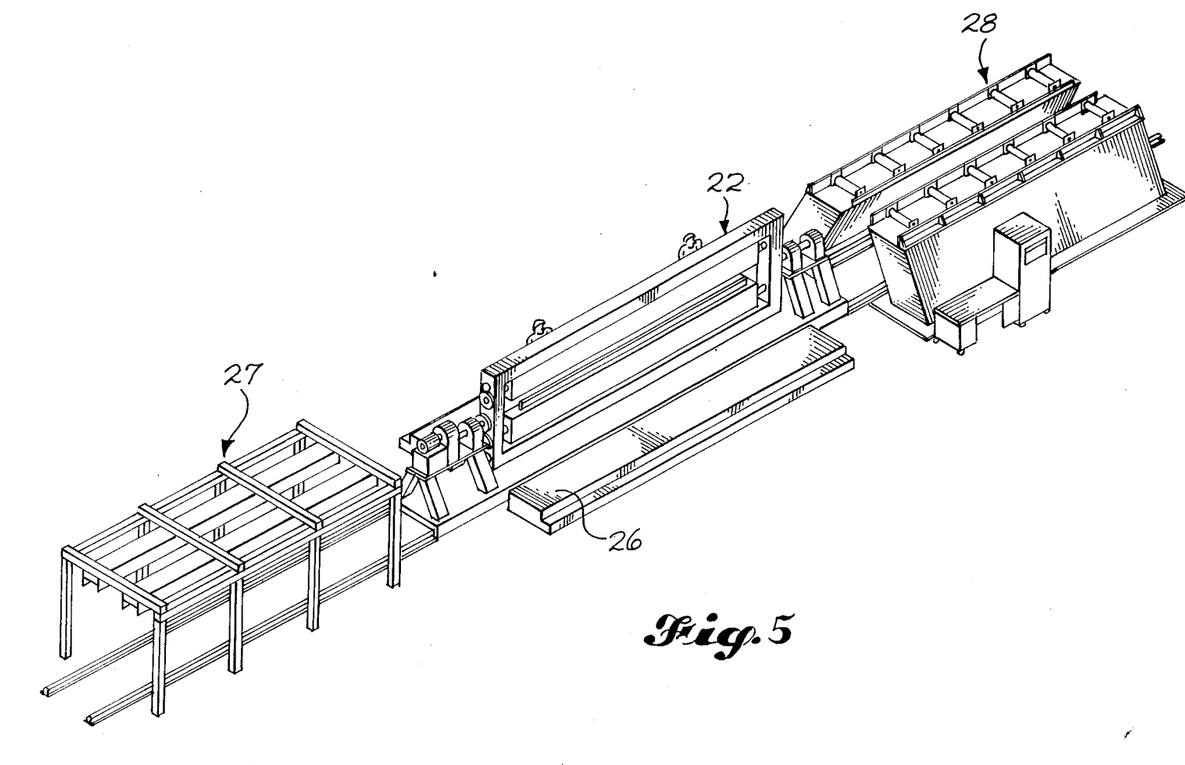
FIG. 5 is a view similar to FIG. 1 showing the I-section workpiece being unloaded from the transporter assembly.

At the form station 27 (FIG. 2) each charge is formed into a channel composed of a web and two flanges and having a somewhat U-shaped cross section. From the form station 27, the transporter 22 is moved in a rightward direction to the load/unload station (FIG. 3) where the two formed charges (channels) are brought together in a back-to-back manner, and radius fillers are attached to the juncture where the formed charges meet. Peel ply is attached to the left sides of the charges over the radius filler and a composite cap is applied to the right sides of the charges over the radius filler. The transporter 22 then moves further rightward to a cure station indicated at 28 (FIG. 4) where the formed charges are joined and cured to form a single piece I-section stringer. The transporter 22 then returns to the load/unload station (FIG. 5) where the I-section stringer is unloaded.

As shown in FIG. 1, the transporter 22 includes a platform 30 which is supported on slotted guides 32 for movement along the rails 24. The transporter is moved by cables (not shown) which are attached to the platform 30 and which are driven by a motor (also not shown). The unformed stringer charges C are supported on a pair of parallel, lengthwise extending mandrels 33 (FIG. 7), each of which is connected to a supporting lengthwise extending horizontal platen 34. Each platen 34, in turn, is supported above a lengthwise extending rotatable support beam 35. Each support beam 35 has a rectangular cross-section with a pair of opposing narrower sides 36, and a pair of opposing wider sides 37.

The rotatable support beams 35 (FIG. 1) are supported inside a rectangular frame 38 by pivot rods 40 in a manner parallel to the tracks 24. The pivot rods extend longitudinally through the support beams 35 and are attached to shorter ends 42 of the frame 38. In this manner, the support beams 35 may be pivoted about their longitudinal axes by a motor 46 which is located at the left end of the platform 30 on a support stand 50. The frame 38 is supported at its ends 42 by left, right shafts 52 with the right shaft being supported via bearing assemblies 53 on a support stand 54, and the left shaft 52 being supported by a bearing assembly 55 on the support stand 50.

Figure 7:
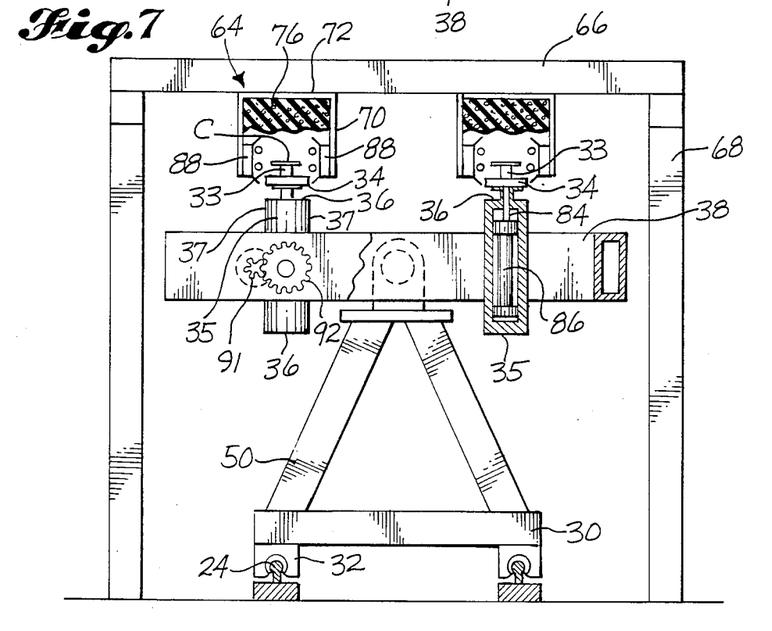
FIG. 7 is an end view of the transporter assembly.
Figure 8:
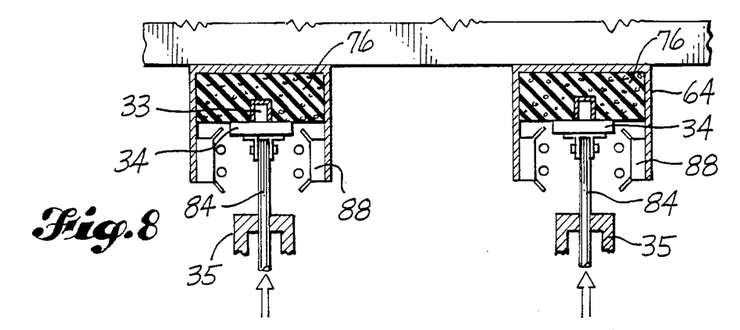
FIG. 8 is a partial side view showing a pair of mandrels being inserted into compliant material for forming charges about the mandrels.

As shown in FIG. 1, the forming station 27 includes a pair of elongate stringer forming enclosures 64 which are mounted above and parallel to the tracks 24. The enclosures 64 are attached to cross-members 66 which in turn are supported by vertical legs 68. Referring to FIG. 7, each enclosure 64 is formed by a pair of vertical sidewalls 70 and a ceiling 72 which extends between the sidewalls 70 and which is connected to the cross-members 66. In order to receive the stringer charge from below, the bottom of each enclosure 64 is open. Extending downward from the enclosure ceiling 72 is a compliant material 76, such as foam rubber or a partially inflated bag, which receives the stringer charge and causes the charge to be formed into the desired shape about the mandrel 33. In the present invention, the mandrels 33 have rectangular cross sectional configurations. More specifically, the sides of the stringer charge C extend laterally beyond the top surface of the mandrel. When the mandrel is inserted into the compliant material (FIG. 8), the sides of the stringer material are displaced downward by the compliant material against the sides of the mandrel to provide the formed charge with a somewhat U-shaped cross-sectional configuration.

The charges C are formed around the mandrels 33 by upward movement of the mandrels into the compliant material 76 (FIG. 7). Movement of each mandrel in the vertical direction is accomplished, by a lengthwise row of hydraulically actuated pistons 84 each having an upper end which is fastened to the bottom of the platen 34. The pistons are driven in a conventional manner by hydraulic cylinders 86 which are located vertically inside of and attached to the support beam 35. The pistons 84 extend through the narrower sides 36 of the support beams.

In order to heat the charge C prior to being formed by the mandrel 33, radiant heaters 88 (FIG. 7) are attached to the opposite sidewalls 70 of the forming enclosure 64. After the stringer charge has formed on the mandrel, the mandrel is retracted from the compliant material and the transporter is returned to the load/unload station.

Once at the load/unload station (FIG. 3), the frame 22 is rotated to a vertical position and the mandrel support beams 35 are rotated so that the mandrels oppose each other in a manner one above the other.

The frame 38 is rotated about its lengthwise axis by the motor 46 (FIG. 6) which engages the left shaft 52 via a gear box 89. Each beam 35 is rotated by a motor 90 via a motor gear 91 and a gear 92 which is attached to the beam support shaft 40. The motors 90 are attached to the left end 42 of the frame 38.

Figure 6:
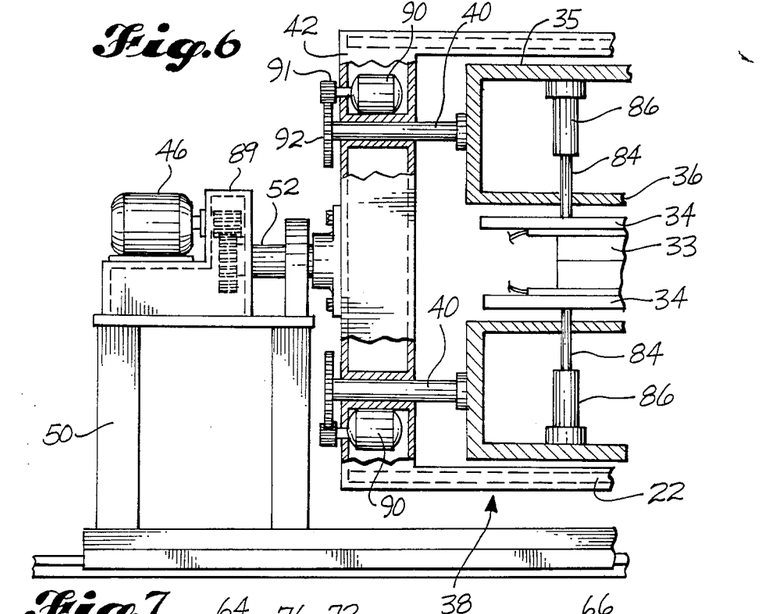
FIG. 6 is a partial side view of the transporter assembly.

It should be noted that when the stringer charges are initially placed on the mandrels 33, the frame 38 is in a horizontal position (FIG. 7) and the beams 35 are perpendicular to the frame so that mandrels 33 are facing upward. However, after the stringer elements are formed in the hot drape station 26, the frame 38 is rotated to a vertical position (FIG. 6). At the same time, the support beams 35 are rotated inside the frame by the motors 90 so that the longer sides 37 of the beams are aligned with the frame in a vertical direction, and the shorter sides 36 of the beams which support the mandrels, oppose each other. In this manner the mandrels 33 are located one above the other.

Figure 9:
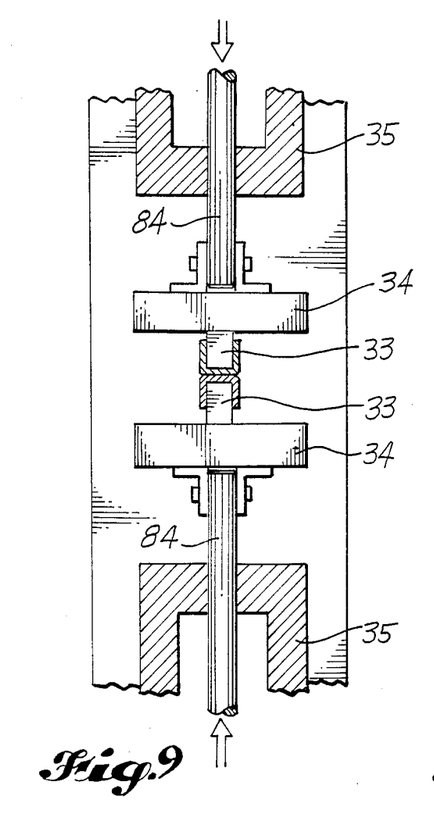
FIG. 9 is a partial side view showing a pair of mandrels which are placed adjacent to each other to join the formed charges.
Figure 10:
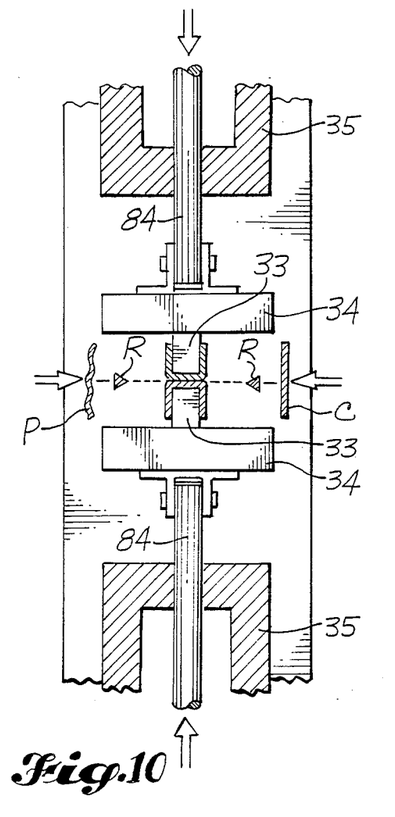
FIG. 10 is a view similar to FIG. 9 showing the attaching of radius fillers, cap, and peel ply to the formed charges.

In order to bring the formed parts of the stringer together, the opposing mandrels are extended towards one another until center portions of the formed charges meet in a back-to-back manner as shown in FIG. 9. In this position, small pieces of stringer material R, referred to as radius filler, are placed along the sides of the junctions where the formed parts meet (FIG. 10). Applied over the left sides of the formed charges is peel ply P which is removed after stringer cure to activate the surface for bonding to the skin panel. Cap plies C are applied to the right sides of the formed charges. Once this procedure has been completed, the transporter remains in this vertical position and shuttles to the cure station 28.

Figure 11:
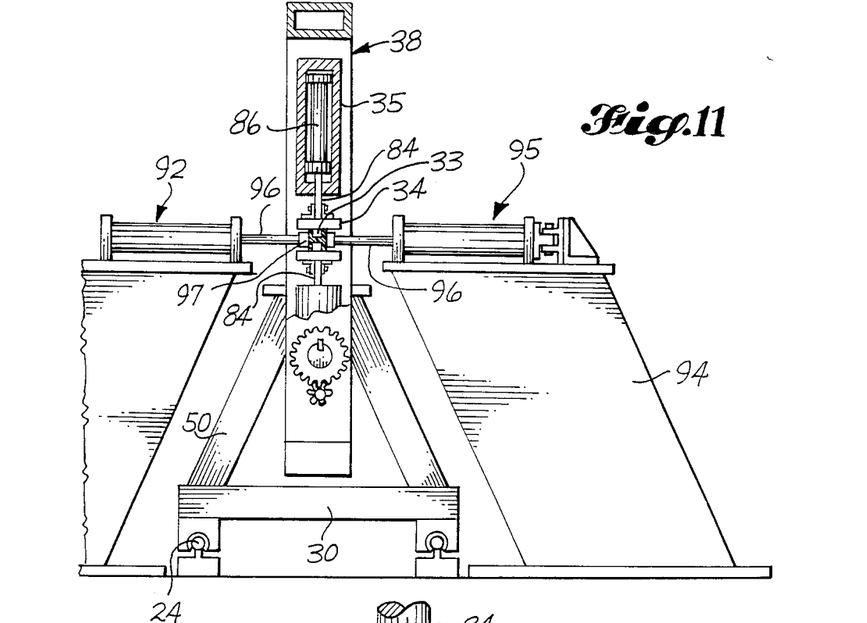
FIG. 11 is an end view of the cure station.

The cure station 28 may be described by referring to FIG. 11 where there is shown support stands 94 which are located at opposite sides of the track 24 for receiving the transporter 22 therebetween. Located atop each stand 94 is a row of piston/cylinder assemblies 95 which are mounted so that each piston 96 of the assembly moves horizontally inward in a manner perpendicular to the tracks 24. More specifically, attached to the ends of the left, right cure station pistons 96 are lengthwise extending vertical platens 97 (FIG. 12) each having a rectangular cross-section and containing therein a vertical lengthwise extending heating element 100. The pistons 96 extend the vertical platens 97 between the horizontal platens 34 of the transporter and into contact with the vertical sides V of the formed charges. In this manner, the sides of the formed charges are cured.

Figure 12:
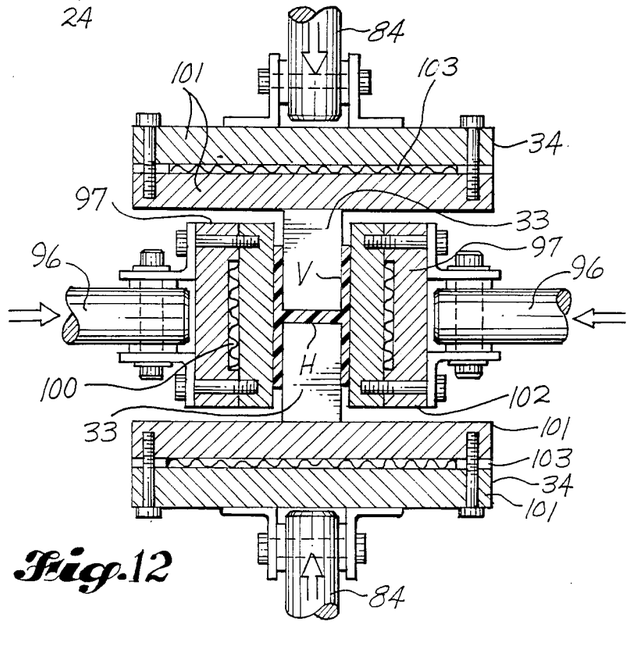
FIG. 12 is a partial end view showing joining of the formed charges into an I-section workpiece at the cure station.

Each horizontal platen 34 is formed by two horizontal plates 101 which are held together by fasteners. Similarly, each platen 97 is formed by two vertical plates 102. Located between each pair of plates 101, 102 is a lengthwise extending heating element 103. In an exemplary embodiment the heating element 103 is a silicon rubber blanket heater which is operated in a conventional manner. In this manner, the platens 97 apply pressure and heat to the vertical sides V of the formed charges. At the same time the mandrels 33, which are heated by the platens 34, apply pressure and heat to the horizontal portions H of the formed charges to join the charges together in forming then I-section stringer.

When the stringer has cured, the cure station platens 97 are withdrawn, and the transporter returns to the load/unload station (FIG. 1) where the mandrels 33 are retracted apart for convenient unloading of the formed I-section stringers. Then frame 38 is rotated to a horizontal position, and the mandrel support beams 35 are rotated to the vertical position to start the cycle over again.

What is claimed is:

1. A system for forming an I-section workpiece comprising:
   a. means for supporting first and second unformed elements for forming the workpiece, the supporting means including a first mandrel for supporting the first element and a second mandrel for supporting the second element;
   b. means for forming the first and second unformed elements into first and second channels of the I-section workpiece on the first and second mandrels, each formed channel of the workpiece including a middle and first and second sidewalls extending from the middle, the forming means further including:
      (1) compliant means,
      (2) means for bringing the first mandrel and the compliant means together so that the compliant means engages the first unformed element and causes the first unformed element to be formed into the first channel;
   c. means for moving the bringing means so that the first mandrel is adjacent the second mandrel and so that the middle of the workpiece first channel is adjacent to the middle of the workpiece second channel; and
   d. means for curing the workpiece in a manner that the middle of the workpiece first channel is bonded to the middle of the workpiece second channel.

2. The system as set forth in claim 1 wherein the first and second unformed elements are flat.

3. The system as set forth in claim 1 wherein:
   a. the first mandrel includes a center surface and first and second side surfaces extending at an angle from the center surface; and
   b. the first unformed element is supported on the first mandrel in a manner that portions of the first unformed element extend beyond the center surface of the mandrel.

4. The system as set forth in claim 1 wherein the curing means includes:
   a. first means for applying heat and pressure to the middle of the workpiece first channel and to the middle of the workpiece second channel to cure the middles of the workpiece first and second channels; and
   b. second means for applying heat and pressure to the sidewalls of the workpiece first channel and to the sidewalls of the workpiece second channel to cure the sidewalls of the workpiece first and second channels.

5. A system for forming an I-section workpiece comprising:
   a. means for supporting unformed first and second elements for forming the workpiece, the supporting means including a first mandrel for supporting the first element and a second mandrel for supporting the second element, the first mandrel including a center surface and first and second side surfaces extending at an angle from the center surface with the first unformed element being supported on the first mandrel in a manner that portions of the first unformed element extend beyond the center surface of the first mandrel;
   b. means for forming the first and second unformed elements into first and second channels of the I-section workpiece on the first and second mandrels, each formed channel of the workpiece including a middle and first and second sidewalls extending from the middle, the forming means further including
      (1) compliant means,
      (2) means for bringing the first mandrel and the compliant means together so that the compliant means engages the first unformed element and causes the portions of the first element extending beyond the center surface of the mandrel to be formed against the first and second side surfaces of the first mandrel in order to form the first channel of the I-section workpiece;
   c. means for moving the bringing means so that the first mandrel is adjacent the second mandrel;
   d. first means for applying heat and pressure to the middle of the workpiece first channel and to the middle of the workpiece second channel to cure the middles of the workpiece first and second channels and to bond the middle of the workpiece first channel to the middle of the workpiece second channel; and
   e. second means for applying heat and pressure to the sidewalls of the workpiece first channel and to the sidewalls of the workpiece second channel to cure the sidewalls of the workpiece first and second channels.

6. The system as set forth in claim 5 wherein:
   a. the forming means includes means for holding the compliant means at a first elevation;
   b. the supporting means includes means for moving the first mandrel so that the center surface occupies a horizontal plane at a second elevation below the first elevation for receiving the first unformed element thereon; and
   c. the bringing means elevates the first mandrel toward the compliant means so that the compliant means engages the first unformed element to form the first channel of the I-section workpiece.

7. The system as set forth in claim 6 wherein:
   a. the second mandrel includes a center surface and first and second side surfaces extending from the center surface at an angle;
   b. the supporting means moves the second mandrel so that the center surface occupies a horizontal plane at a second elevation below the first elevation for receiving the second unformed element thereon;
   c. the bringing means elevates the second mandrel toward the compliant means so that the compliant means engages the second unformed element to form the second portion of the I-section workpiece;
   d. the moving means moves the bringing means so that the center surface of the first mandrel and the center surface of the second mandrel oppose each other; and
   e. the bringing means moves the first and second mandrels toward each other so that the middle of the workpiece first channel is adjacent to the middle of the workpiece second channel.

8. The system as set forth in claim 6 wherein the forming means includes means for heating the first unformed element prior to the compliant means engaging the first unformed element to allow the first unformed element to be formed by the compliant means and the first mandrel.

9. The system as set forth in claim 6 wherein:
   a. the forming means further includes means for supporting the compliant material at the first elevation;
   b. the second pressure and heating means includes:
      (1) first means for applying pressure in a horizontal direction to the first sidewalls of the workpiece first and second channels, and
      (2) second means for applying pressure in a horizontal direction to the second sidewalls of the workpiece first and second channels;
   c. the supporting means includes:
      (1) first elongate means for supporting the first mandrel;
      (2) second elongate means for supporting the second mandrel;
      (3) frame means for supporting the first elongate means for rotation about a first axis, and for supporting the second elongate means for rotation about a second axis;
   d. means for transporting the frame means between the forming means at a first location and the second pressure and heating means at a second location; and
   e. means for rotating the frame means about a third axis between (i) a horizontal position so that the first and second mandrels are positioned below the compliant means when the frame means is at the first location, and (ii) a vertical position in which the frame means is located between the first and second horizontal pressure applying means when the frame means is at the second location.

10. The system as set forth in claim 9 wherein:
    a. the first pressure and heating means includes first means for heating the first mandrel and second means for heating the second mandrel.

11. The system as set forth in claim 10 wherein the first pressure and heating means includes the bringing means, connected to the transporting means, which moves the first mandrel and the second mandrel toward each other so that the middle of the workpiece first channel engages the middle of the workpiece second channel.

12. The system as set forth in claim 11 wherein:
    a. the first horizontal pressure applying means of the second pressure and heating means includes:
       (1) a first platen,
       (2) means for extending the first platen in a first horizontal direction,
       (3) first means for supporting the first platen extension means so that the first platen engages the first sidewalls of the workpiece first and second channel when the first platen is extended; and
    b. the second horizontal pressure applying means of the second pressure and heating means includes:
       (1) a second platen,
       (2) means for extending the second platen in a second horizontal direction which is opposite to the first horizontal direction,
       (3) second means for supporting the second platen extension means so that the second platen engages the second sidewalls of the workpiece first and second channel when the second platen is extended, the second supporting means being spaced apart from the first platen extension supporting means to receive the frame means therebetween.

13. The system as set forth in claim 12 wherein the moving means includes means for rotating the first elongate means about the first axis and the second elongate means about the second axis, when the frame means is rotated to a vertical position, so that the center surface of the first mandrel opposes the center surface of the second mandrel.

14. The system as set forth in claim 9 wherein the means for rotating the frame means includes means for rotating the first and second elongate means so that (i) when the frame means is at the first location, the first unformed element and the second unformed element occupy a horizontal plane below the compliant means, and (ii) when the frame means is at the second location, the middle of the workpiece first channel and the middle of the workpiece second channel occupy horizontal planes next to each other for joining and curing the middle of the workpiece first channel to the middle of the workpiece second channel by the first and second mandrels, and the first and second sidewalls of the first and second channels occupy vertical planes for receiving the first and second platens to cure the first and second sidewalls of the workpiece first and second channels.

15. The system as set forth in claim 14 wherein:
    a. the first pressure and heating means includes the bringing means which moves the first and second mandrels in a vertical direction to join and cure the middle of the workpiece first channel to the middle of the workpiece second channel; and
    b. the second pressure and heating means includes means for moving the first and second platens in a horizontal direction to cure the first and second sidewalls of the workpiece first and second channels.

* * * * *